United States Patent [19]

Rijkeboer

[11] Patent Number: 4,503,831

[45] Date of Patent: Mar. 12, 1985

[54] APPARATUS FOR AIR-INJECTION OF LIQUID GAS

[75] Inventor: Rudolf C. Rijkeboer, Voorburg, Netherlands

[73] Assignee: Robert Bosch GmbH, Stuttgart, Fed. Rep. of Germany

[21] Appl. No.: 569,882

[22] Filed: Jan. 11, 1984

[30] Foreign Application Priority Data

Apr. 9, 1983 [DE] Fed. Rep. of Germany ....... 3312758

[51] Int. Cl.³ .................. F02B 43/00; F02M 21/04
[52] U.S. Cl. .................... 123/525; 123/452; 123/527
[58] Field of Search ............ 123/452, 453, 454, 455, 123/527, 526, 525

[56] References Cited

U.S. PATENT DOCUMENTS

| | | | |
|---|---|---|---|
| 1,253,623 | 1/1918 | Maxwell | 123/525 |
| 2,675,793 | 4/1954 | Ziege | 123/525 |
| 3,184,295 | 5/1965 | Bauerstock | 123/525 |
| 4,227,503 | 10/1980 | Wessel | 123/452 |
| 4,228,777 | 10/1980 | Haase | 123/452 |
| 4,370,967 | 2/1983 | Gmelin | 123/452 |
| 4,373,490 | 2/1983 | Kimata | 123/452 |
| 4,391,252 | 7/1983 | Jäggle | 123/452 |
| 4,441,475 | 4/1984 | Bouchard | 123/525 |
| 4,453,523 | 6/1984 | Poehlman | 123/527 |

FOREIGN PATENT DOCUMENTS

| | | | |
|---|---|---|---|
| 0005407 | 1/1980 | Japan | 123/527 |
| 0155266 | 9/1983 | Japan | 123/525 |

*Primary Examiner*—Charles J. Myhre
*Assistant Examiner*—Carl Stuart Miller
*Attorney, Agent, or Firm*—Edwin E. Greigg

[57] ABSTRACT

An apparatus for the air-injection of liquid gas into the intake tube of an internal combustion engine. The apparatus includes a vaporizer pressure regulating valve, downstream of which a metering valve having a metering piston is disposed, which being movable in a guide bore opens a metering opening to a greater or lesser extent. The adjustment of the metering piston is effected in accordance with the quantity of air aspirated by the engine as determined by an air flow rate meter, as a result of which a quantity of liquid gas corresponding to the aspirated air quantity can be metered. The mixture of liquid gas and air can be influenced by a control pressure prevailing in a control chamber of the vaporizer pressure regulating valve, and this control pressure is influenced by a control pressure regulating valve and the movable valve element of which is engaged on one side by the intake tube pressure upstream of the air flow rate meter and on the other side, coupled via a throttle, by the control pressure and a regulating spring and to the valve seat of which a negative-pressure line leads from the intake tube from downstream of a throttle valve.

7 Claims, 4 Drawing Figures

APPARATUS FOR AIR-INJECTION OF LIQUID GAS

BACKGROUND OF THE INVENTION

The invention is based on an apparatus for the air-injection of liquid gas. An apparatus for the air-injection of liquid gas is already known but in which the intake tube pressure downstream of the throttle valve has an undesirable influence on the regulated mixture of liquid gas and air.

OBJECT AND SUMMARY OF THE INVENTION

The apparatus according to the invention has the advantage over the prior art that independently of the varying intake tube pressures downstream of the throttle valve, it is possible to regulate a mixture ratio of liquid gas to air which is adapable to operating parameters of the associated internal combustion engine.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
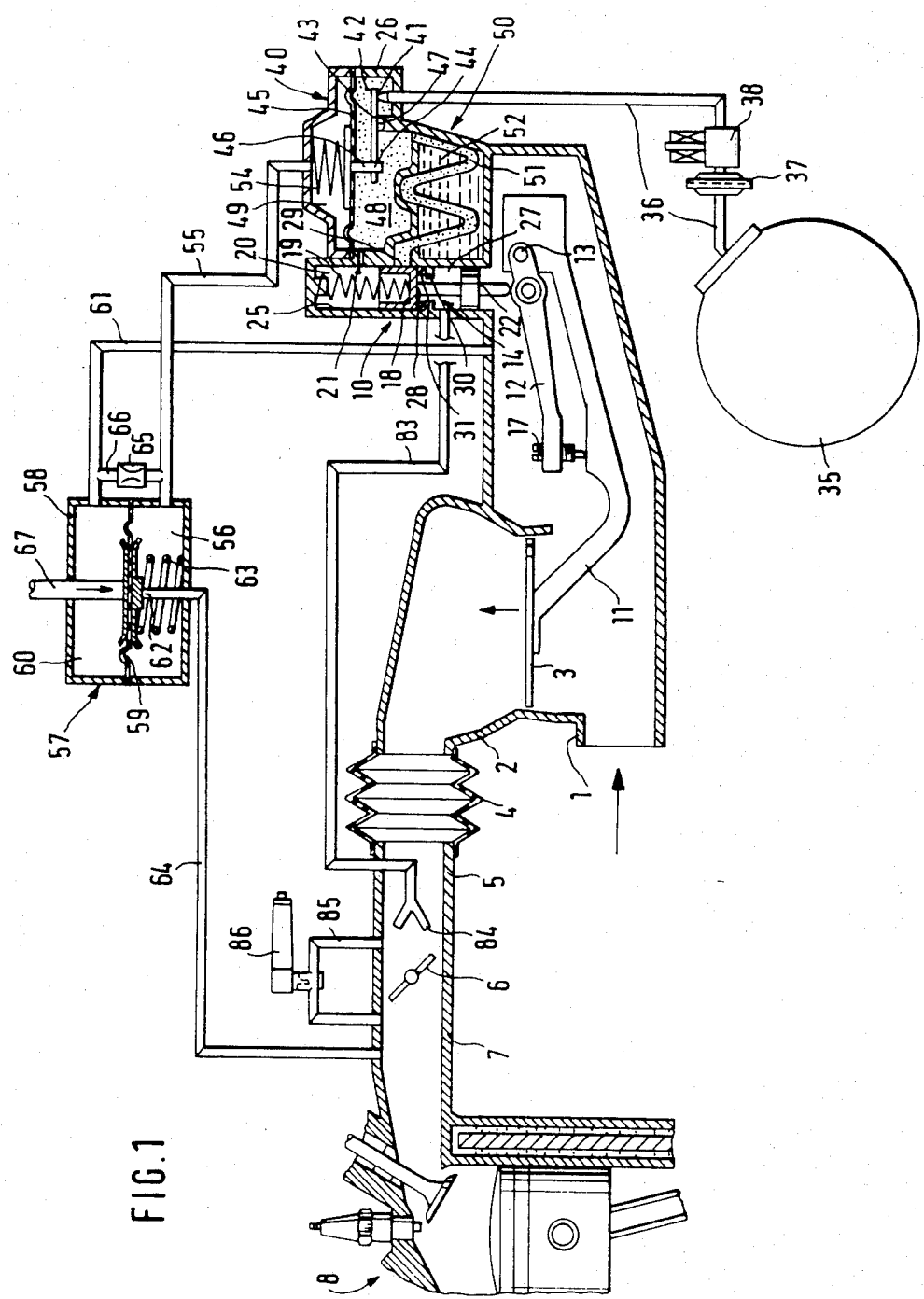
FIG. 1 shows an injection system for liquid gas with a first exemplary embodiment of a control pressure regulating valve.

In the injection system for liquid gas (LPG) shown in FIG. 1, the air for combustion flows downstream of an air filter (not shown) in the direction indicated by the arrow via an intake tube section 1 into a conical section 2, in which an air flow rate meter 3 is disposed and flows further through an elastically deformable section 4 and a section 5 via a throttle valve 6 to an intake tube section 7 and from there to one or more cylinders 8 of an internal combustion engine, for instance a mixture-compressing internal combustion engine that either has externally supplied ignition or is self-igniting. The air flow rate meter 3 is by way of example a baffle valve 3, which is disposed transversely to the flow direction and moves in the conical section 2 of the intake tube, for instance in accordance with an approximately linear function of the quantity of air flowing through the intake tube; given a constant restoring force engaging the air flow rate meter 3 and a constant air pressure prevailing upstream of the air flow rate meter 3, the pressure prevailing between the air flow rate meter 3 and the throttle valve 6 likewise remains constant. The air flow rate meter 3 controls a metering valve 10. The adjusting movement of the air flow rate meter 3 is transmitted by a pivot lever 11 connected with it, which is supported in common with a correcting lever 12 on a pivot point 13 and upon its pivoting movement actuates a movable valve element, embodied as a metering piston 14, of the metering valve 10. The desired fuel-air mixture is correctable by a mixture regulating screw 17 between the pivot lever 11 and the correcting lever 12. The end 18 of the metering piston 14 remote from the pivot lever 11 is engaged by a restoring spring 19, which tends via the metering piston 14 to pivot the air flow rate meter 3 into its outset position, in which with the engine not in operation it virtually closes the intake tube cross section. The restoring spring 19 is disposed in a spring chamber 20, which is preferably ventilated via a throttling tie line 21 in favor of a vaporizer chamber 48 of a vaporizer pressure regulating valve 40. The intake tube pressure in the intake tube section 1 upstream of the air flow rate meter prevails at the end 22 of the metering piston 14 oriented toward the pivot lever 11.

The metering piston 14 is slidably supported in a guide bore 25 of the metering and vaporizer housing 26 and is provided with an annular groove 27. Remote from the pivot lever 11, the annular groove 27 is defined by an axial limiting face 28, which upon an axial movement of the metering piston 14 opens a metering opening 29, embodied for instance in the form of a slit in the wall of the guide bore 25, to a greater or lesser extent toward the annular groove 27. Protruding into the annular groove 27 is an annular shoulder 30 of the guide bore 25, on which, oriented toward the limiting face 28, a sealing ring 31 rests, against which in the absence of flowing air, that is, when the engine is shut off, the limiting face 28 of the metering piston 14 is pressed in a sealing manner by the restoring spring 19.

The supply of fuel to the injection system is effected from a liquid gas tank 35, which is embodied as an especially constructed pressure container and which receives liquid gas at a pressure of ca. 15 to 20 bar when in the filled state. A supply line 36 leads from the liquid gas tank 35 via a filter 37 and an interrupter valve 38, which when the system is shut off closes the supply line 36, to the vaporizer pressure regulating valve 40. The supply line 36 terminates in the vaporizer pressure regulating valve 40 in a regulating nozzle 41, with which for instance the end 42, serving as a movable valve element, of a two-armed lever 43 cooperates in such a manner that the outflow cross section of the regulating nozzle 41 is opened to a greater or lesser extent. The other end 44 of the lever 43 is engaged by a vaporizer diaphragm 45, provided as a yielding wall in the vaporizer pressure regulating valve 40, via an actuation pin 46. The lever 43 is pivotable about a bearing point 47. The vaporizer diaphragm 45 divides a vaporizer chamber 48 from a control chamber 49. The vaporizer chamber 48 receives the regulating nozzle 41, the lever 42 and the liquid gas emerging from the regulating nozzle 42. In the vaporizer chamber 48, this liquid gas is vaporized and expanded to a certain pressure and can then flow via a feed line 51, leading through a heat exchanger 50, to the metering opening 29. Flowing through the heat exchanger 50 may be, for instance, the coolant 52 of the engine.

A compression spring 54 is disposed in the control chamber 49 of the vaporizer pressure regulating valve 40 and is supported on the vaporizer diaphragm 45 in such a manner that it tends to raise the end 42 of the lever 43 from the regulating nozzle 41 and thereby to permit a larger quantity of liquid gas to emerge. From the control chamber 49 of the vaporizer pressure regulating valve 40, a control pressure line 55 leads to a control pressure chamber 56 of a control pressure regulating valve 57.

The control pressure regulating valve 57 has a housing 58, which is divided by a diaphragm 59 serving as a movable valve element and fastened in place at its circumference into the control pressure chamber 56 and a high-pressure chamber 60. The high-pressure chamber 60 communicates via a high-pressure line 61 with the intake tube section 1 upstream of the air flow rate meter 3. The diaphragm 59 cooperates with a fixed valve seat 62 and is urged in the opening direction of the control pressure regulating valve by a regulating spring 63 likewise disposed in the control pressure chamber 56. From the valve seat 62, a negative-pressure line 64 leads to the intake tube section 7 downstream of the throttle valve 6. The high-pressure line 61 and the control pressure line 55 communicate with one another via a throttle restriction 65, which may for instance be disposed in a connecting line 66 or, not shown, in the diaphragm 59. By means of an actuation member 67 protruding into the high-pressure chamber 60, a corrective force dependent on such operating parameters of the engine as temperature, rpm, throttle valve position, exhaust gas composition and others can engage the diaphragm 59 in the closing direction of the control pressure regulating valve 57. By the distribution of pressure between the fixed throttle 65 and the control pressure regulating valve 57, which represents a variable throttle, a constant control pressure predetermined by the force of the regulating spring 63 is regulated in the control chamber 49 of the vaporizer pressure regulating valve 40, the valve of which control pressure is correctable by intervening via the actuation member 67. The control pressure prevailing in the control chamber 49 of the vaporizer pressure regulating valve 40 determines the pressure of the vaporized liquid gas prevailing in the vaporizer chamber 48 and thus determines the fuel pressure prevailing upstream of the metering opening 29 of the metering valve; this fuel pressure, along with the position of the metering piston 14 relative to the metering opening 29, determines the metered quantity of liquid gas and thus determines the ratio of the mixture of liquid gas and air supplied to the engine. If the engine is operated in the vicinity of full load, then the throttle valve 6 virtually opens the intake tube cross section, and the intake tube pressure downstream of the throttle valve 6 increases above the control pressure regulated by the regulating spring 63 at the control pressure regulating valve 57, causing this control pressure to rise in turn, which may be desirable in order to attain a richer fuel-air mixture during full-load operation of the engine. It may also be desirable, when the engine is operated near the full-load range, for the control pressure regulating valve 57 to be closed by a force engaging it via the actuation member 67 upon the attainment of the control pressure of the control pressure regulating valve 57 determined by the regulating spring 63; the result is that the air pressure prevailing upstream of the air flow rate meter 3 becomes effective directly in the control chamber 49 of the vaporizer pressure regulating valve 40, via the high-pressure line 61 and the throttle restriction 65, and causes an enrichment of the fuel-air mixture.

The system functions as follows:

When the engine is started, the interrupter valve 38 is opened and the liquid gas flows via the supply line 36 to the regulating nozzle 41 of the vaporizer pressure regulating valve 40, by means of which it is possible to regulate a pressure of the vaporized liquid gas which is constant, but is also variable by means of the control pressure in the control chamber 49 in accordance with operating characteristics of the engine. The liquid gas vaporized in the vaporizer chamber 48 flows through the heat exchanger 50 via the feed line 51 and is cooled by the coolant, which still has a low temperature and from which the necessary heat of vaporization has been withdrawn, so that the gas has a higher density than if the coolant were warmer, as it is after the engine warmup phase is completed. This higher density results in a larger metered quantity of gas at the metering valve 10 and thus causes an enrichment of the mixture supplied to the engine. Upon starting, the engine aspirates air via the intake tube 1, as a result of which the flow rate meter 3 undergoes a certain deflection out of its position of rest. In accordance with this deflection of the flow rate meter 3, the metering piston 14 is deflected as well via the lever 11, and the limiting face 28, depending on the position of the metering piston 14, opens the metering opening 29 to a greater or lesser extent toward the annular groove 27, so that in accordance with the quantity of aspirated air as detected by the air flow rate meter 3, a corresponding quantity of gas is metered at the metering valve 10, and this quantity is carried for instance to the intake tube section 5 via an air-injection line 83, which communicates with the annuluar groove 27 of the metering piston 14, and is air-injected into the intake tube section 5 via one or more nozzles 84 upstream of the throttle valve 6. For the control of a larger mixture quantity during engine warmup, a bypass 85 is provided on the intake tube 5, 7 which bypasses the throttle valve 6, and the cross section of which is controlled in a known manner in accordance with temperature by a supplementary mixture valve 86 during the warmup phase of the engine.

The direct connection between the air flow rate meter 3 and the metering piston 14 effects a certain ratio between the aspirated air quantity and the metered gas quantity. If because of certain operating conditions it is desirable for instance to enrich the gas-air mixture supplied to the engine, then a relatively higher pressure can be controlled by the control pressure regulating valve 57 in the control chamber 49 of the vaporizer pressure regulating valve 40, and this higher pressure then, as a result of a wider opening of the vaporizer pressure regulating valve 40, results in a higher pressure on the part of the vaporized liquid gas at the metering opening; this in turn, because of the greater pressure drop through the metering valve 10, causes a larger quantity of gas to be metered and air-injected through the nozzle 84.

Figure 2:
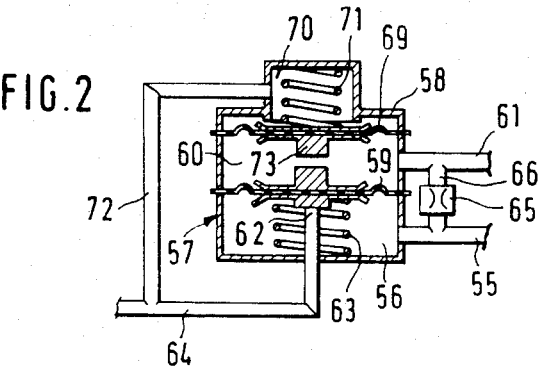
FIG. 2 shows a second exemplary embodiment of a control pressure regulating valve.

In the second exemplary embodiment of a control pressure regulating valve shown in FIG. 2, elements having the same function as in the first exemplary embodiment shown in FIG. 1 are identified by the same reference numerals. In FIG. 2, the high-pressure chamber 60 is divided, remote from the diaphragm 59, from a negative-pressure chamber 70 by a yielding switching diaphragm 69; a compression spring 71 engaging the switching diaphragm 69 is disposed in this negative-pressure chamber 70, which communicates with the negative-pressure line 64 toward the area downstream of the throttle valve 6 via a coupling line 72. Above an intake tube pressure predetermined by the force of the compression spring 71, in the vicinity of full-load operation of the engine, the switching diaphragm 69 is pressed so far in the direction of the diaphragm 59 that via an engagement body 73 it engages the diaphragm 59 and presses it toward the valve seat 62, resulting in the closure of the control pressure regulating valve 57, as a result of which as already described, the pressure in the high-pressure line 61 comes into effect in the control chamber 49 of the vaporizer pressure regulating valve 40.

Figure 3:
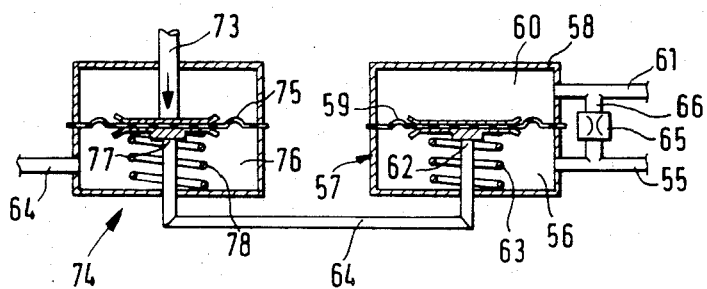
FIG. 3 shows a third exemplary embodiment of a control pressure regulating valve.

In the exemplary embodiment of FIG. 3, elements of identical function are again identified by the same reference numerals. Here, a blocking valve 74 is disposed in the negative-pressure line 64 downstream of the control pressure regulating valve 57. The blocking valve 74 has a blocking diaphragm 75 embodied as a yielding wall, in which in a spring chamber 76 a valve seat 77 and a spring 78 acting in the opening direction are disposed. The blocking diaphragm 75 may be engaged by an engagement body 73, which at a predetermined intake tube pressure downstream of the throttle valve 6, in the vicinity of full-load operation of the engine, presses the blocking diaphragm 75 against the valve seat 77, so that the negative-pressure line 64 carried via the valve seat 77 and thus the blocking valve 74 are closed, and as already described only the pressure in the high-pressure line 61 now prevails in the control chamber 49 of the vaporizer pressure regulating valve 40.

Figure 4:
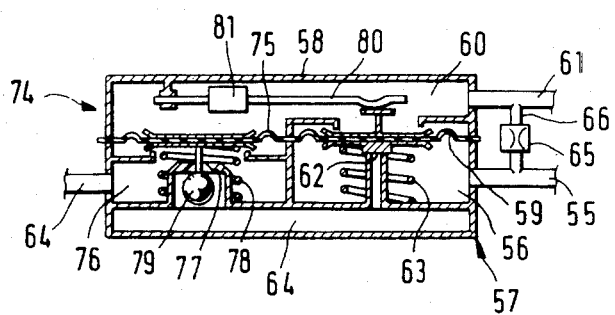
FIG. 4 shows a fourth exemplary embodiment of a control pressure regulating valve.

In the exemplary embodiment shown in FIG. 4, elements functioning like those of the foregoing embodiments are again identified by the same reference numerals. Here the diaphragm 59 of the control pressure regulating valve 57 and the blocking diaphragm 75 of the blocking valve 74 are stretched out in such a way in a common housing 58 that on one side they define the high-pressure chamber 60. Downstream of the valve seat 62, the negative-pressure line 64 is carried via the valve seat 77 of the blocking valve 74, into which valve seat a closing body 79 protrudes, which on the other end is connected with the blocking diaphragm 75 and is movable in the closing direction by means of the spring 78 supported on the blocking diaphragm 75. If the difference between the pressures in the high-pressure chamber 60 and the spring chamber 76 becomes smaller than a difference predetermined by the force of the spring 78, which is the case in the vicinity of full-load operation of the engine, then the blocking diaphragm 75 draws the closing body 79 against the valve seat 77, and the blocking valve 74 is closed, as a result of which as described above the pressure in the high-pressure line 61 becomes effective in the control chamber 49. If during the warmup phase of the engine an increased enrichment of the mixture of liquid gas and air supplied to the engine should be desired, then a bimetallic spring 80 may be disposed on the control pressure regulating valve 57, this spring 80 engaging the diaphragm 59 in such a manner that the control pressure regulating valve 57 is closed to a greater extent, so that the control pressure regulated in the control pressure chamber 56, and thus the control pressure in the control chamber 49 of the vaporizer pressure regulating valve 40 as well, is increased, as a result of which the regulating nozzle 41 is opened to a greater extent and the gas pressure in the vaporizer chamber 48 increases. After the warmup phase of the engine has elapsed, or after the bimetallic spring 80 has been heated up by an electric heating body 81, the bimetallic spring 80 bends so far in the direction away from the diaphragm 59 that it exerts no further influence on the diaphragm 59.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for the air-injection of liquid gas into an intake tube of an internal combustion engine comprising a vaporizer pressure regulating valve, which has a yielding wall and a movable valve element, said movable valve element of the vaporizer pressure regulating valve being actuatable by said yielding wall which is engaged on one side by the pressure of the vaporized liquid gas and on the other side by a compression spring in a control chamber communicating with a control pressure line and the pressure of a control air regulated in the control pressure line by a control pressure regulating valve, at the movable valve element of which on one side the intake tube pressure upstream of an air flow rate meter measuring the air throughput in the intake tube upstream of a throttle valve prevails and a metering valve disposed downstream of the vaporizer pressure regulating valve, said movable valve element of said metering valve is embodied as a metering piston and actuated by the air flow rate meter, said movable valve element opens a metering cross section for the gaseous fuel to a greater or lesser extent toward the air-injection line leading to the intake tube and can be acted upon on one side by a restoring spring and the pressure of the vaporized liquid gas in the vaporizer pressure regulating valve and on the other side by the intake tube pressure upstream of the air flow rate meter and by the air flow rate meter, wherein the movable valve element of the control pressure regulating valve opens a valve seat disposed in a control pressure chamber communicating with the control pressure line to a greater or lesser extent, from which a negative-pressure line leads from a valve seat to the intake tube downstream of a throttle valve and the control pressure chamber includes therein a regulating spring which urges the movable valve element in the opening direction of the control pressure regulating valve toward a high-pressure chamber communicating via a high-pressure line with the intake tube upstream of the air flow rate meter wherein the high-pressure line and the control pressure line communicate via a throttle restriction.

2. An apparatus as defined by claim 1, in which the movable valve element of the control pressure regulating valve may be engaged by a corrective force dependent on operating parameters of the engine, in the closing direction of the control pressure regulating valve.

3. An apparatus as defined by claim 2, in which a diaphragm serves as the movable valve element of the control pressure regulating valve.

4. An apparatus as defined by claim 3, wherein remote from the diaphragm of the control pressure regulating valve the high-pressure chamber is divided by a yielding wall from a negative-pressure chamber in which a compression spring engaging the yielding wall is disposed and which communicates with the intake tube downstream of the throttle valve wherein above a predetermined intake tube pressure downstream of the throttle valve the yielding wall acts upon the diaphragm in such a manner that the control pressure regulating valve is closed.

5. An apparatus as defined by claim 3, in which a blocking valve is disposed downstream of the control pressure regulating valve, in the negative-pressure line which can be closed in accordance with operating parameters of the engine.

6. An apparatus as defined by claim 5, in which the blocking valve has a yielding wall which can be acted upon on one side by the intake tube pressure upstream of the air flow rate meter and on the other side by the intake tube pressure downstream of the throttle valve and by a spring and the blocking valve 74 closes as soon as the difference between the pressures at either side of the yielding wall becomes smaller than a predetermine difference.

7. An apparatus as defined by claim 2, in which the movable valve element of the control pressure regulating valve is engaged, at temperatures below the engine operating temperature, by a bimetallic spring, acting as the corrective force, in the closing direction of the control pressure regulating valve.

* * * * *